Jan. 3, 1967 W. F. GRIFFITH 3,296,520

ELECTRICALLY CONTROLLED VARIABLE RESISTANCE

Filed Oct. 26, 1962

INVENTOR.
WILLIAM F. GRIFFITH
BY Jacobi & Davidson
ATTORNEYS 3,296,520
ELECTRICALLY CONTROLLED VARIABLE RESISTANCE
William F. Griffith, 3609 Kimble Road, Baltimore, Md. 20918
Filed Oct. 26, 1962, Ser. No. 233,479
Claims priority, application Great Britain, Oct. 26, 1961, 38,344/61
5 Claims. (Cl. 323—74)

This invention relates to a linear variable resistor device which is electrically controlled, and in particular with circuits employing a pair of bipolar voltage limiters or double-anode, common-cathode (Zener) diodes connected to provide a variable resistor having nearly linear characteristics over a relatively wide operating range of signal voltage drop across the resistance, and the facility of being readily and reliably electrically controlled to vary the resistance, as desired.

To this effect, the invention comprises a circuit employing a pair of bipolar voltage limiters connected either in series or parallel with each other and between a pair of external terminals referred to hereafter as signal terminals. Further means, including a high impedance current source, are provided to pass control current through the diodes and thereby modify the resistance they present between the signal terminals. When the diodes are series connected between the signal terminals, they are conveniently parallel connected for control current purposes, and vice versa.

In accordance with an important practical feature of the invention, a particular kind of bipolar voltage limiter is selected, namely a limiter having a high reverse current (a nominal reverse current of 5$\mu$ amps or more at 1 volt at 25° C.). Such a limiter would normally be rejected in a production line, as having too high reverse conductance, but it has been discovered that the use of such diodes to form a variable resistor circuit provides substantial advantages in practical performance, as will appear more fully from the description below.

Two circuits constructed in accordance with the present invention are illustrated by way of example only in the accompanying drawings, in which.

Figure 1:
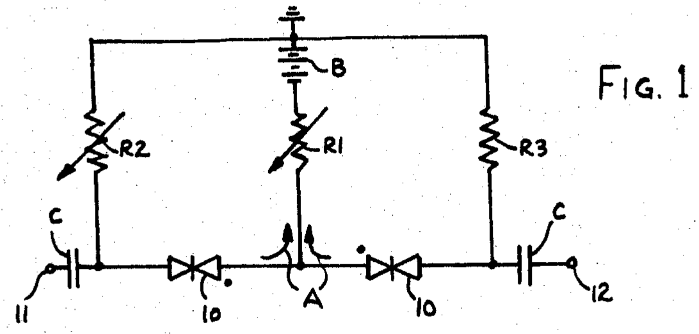
FIGURE 1 shows a first such circuit.

The circuit of FIGURE 1 is referred to as a series circuit because it employs a pair of bipolar voltage limiters, or double-anode Zener diodes 10 connected in series between signal terminals 11 and 12.

Before continuing with a discussion of FIGURE 1, reference will be made to FIGURE 2 which shows a voltage-current curve 13 for a typical Hoffman RT–6 diode. In each direction from the ordinate, the curve extends substantially linearly until the avalanche voltage is approached. In the example taken, the avalanche voltage has been chosen as about 5 volts, as this is typical of this type of diode. The avalanche voltage can, however, be made much higher, if desired (up to say 200 volts with presently available units). At the avalanche voltages, the curve 13 virtually becomes vertical, that is, there is a small change of voltage for a large change in current. In one direction of conduction, the diode passes about 0.03 milliamp before reaching the avalanche voltage; in the other direction, the current reaches about 0.1 milliamp, from which it will be seen that the slopes of the two parts of curve 13 on each side of the ordinate are not usually equal; and such a typical case has therefore been chosen for illustration. The nominal cathode is signified by the dots adjacent one another of each of the limiters in FIGURE 1, as it will normally be signified on the casing of the RT–6 limiter. Note that these nominal cathodes are connected together in this circuit.

Figure 2:
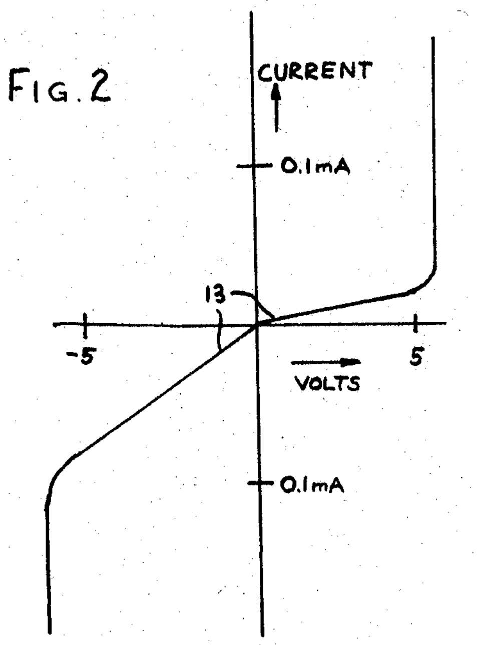
FIGURE 2 is a diagram illustrating the characteristics of the individual limiters of the circuit of FIGURE 1.

In order to achieve the characteristics shown in FIGURE 2 it is necessary to select special bipolar voltage limiters. Most production limiters are made to specifications which give them too low reverse conductance between the avalanche voltages to be practical for use with present transistor circuits. It is necessary therefore either to select production Zener diodes that have been rejected for reason of too high a conductance, or to make such "high conductance" diodes specially for the purpose. This selection is necessary in order that the resistance across terminals 11 and 12 should be within the range normally required in transistor circuit practice for variable resistors of this type, that is below the order of 1 megohm. For most practical applications, it can be said that diodes having a nominal reverse current of at least 5$\mu$ amps at 1 volt at 25° C. should be selected for these purposes.

Reverting to the circuit of FIGURE 1, the nominal cathodes of diodes 10 are connected together and to one end of resistor R1, the other end of which is connected through a battery B to two further resistors R2 and R3, the remote ends of which are connected back to the respective diodes 10 whereby to form two direct current loops from the battery B: one through resistors R1 and R2 and the left-hand diode 10; the other through resistors R1 and R3 and the right-hand diode. The currents in these loops, shown by arrows A, can be made equal to each other by adjusting resistor R2 (if necessary including ammeters in the loops for this purpose). The magnitude of the total current is adjustable by varying resistor R1. The resistance values of resistors R1, R2 and R3 will all be very high, much higher than that of diodes 10, so as to represent no effective shunt to the series circuit that the diodes 10 constitute across the signal terminals 11, 12.

As the control currents in the loops are varied such as, for example, by varying the resistance of resistor R1 of FIGURE 1, the resistance which the signal terminals 11, 12 exhibit to an external circuit is modified. Capacitors C have been shown as optional elements in the series circuit, to serve the purpose of isolating the direct control current from the external circuit. It should be noted that the capacitors C can be eliminated from the circuit of FIGURE 1 provided that the external circuits to which the circuit of FIGURE 1 is connected have direct current voltages, with no A.C. signal applied at terminals 11 and 12, which are not significantly different from the voltages at terminals 11 and 12 due to the control currents, and provided that the external circuits do not appreciably load the control currents. Also, by replacing the battery B with an ungrounded source of current (and by removing the ground shown above battery B in FIGURE 1), the capaictors C may become superfluous.

Figure 3:
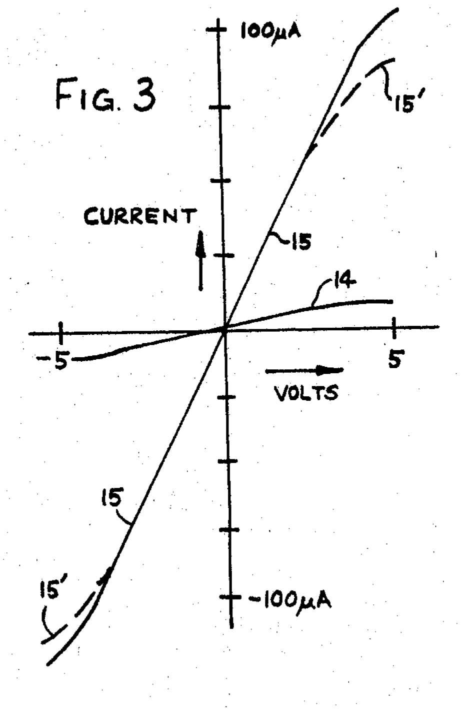
FIGURE 3 is a diagram illustrating the characteristics of the overall circuit of FIGURE 1.

The characteristics of the overall circuit are shown in FIGURE 3. Curve 14 shows the curve of current against voltage between terminals 11 and 12 with zero control current (resistor R1 infinite); curve 15 shows the curve of current against voltage for these terminals with a large control current, say the order of 50$\mu$ amps. The broken lines 15' show how the curve 15 will depart from linearity at a lower voltage if the diodes were connected in the opposite direction to that shown, namely with their nominal cathodes facing away from each other.

The variable resistor obtained with the circuit of FIGURE 1 has a range of about 30K ohms to 650K ohms depending on the magnitude of the control current, and is highly linear over an extended voltage range using the following component: bipolar voltage limiters 10, Catalogue No. RT–6, made by Hoffman Electronics Corporation, Los Angeles. The control current for a resistance of 30K ohms would be approximately 100$\mu$ amps, and at a series resistance of 650K ohms the control current would be approximately 0.3$\mu$ amps. The voltage range over which the resistance operates can, as already explained, be increased by the use of diodes of higher avalanche voltages.

Figure 4:
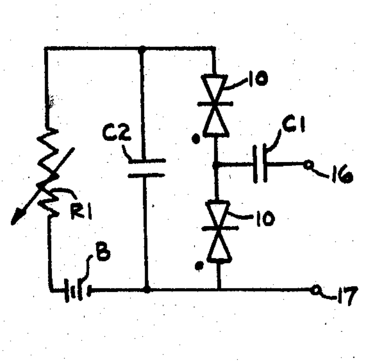
FIGURE 4 shows the second circuit.

An alternative, shunt circuit is shown in FIGURE 4, and comprises two similar high leakage conductance double-anode Zener diodes 10 connected in shunt across the signal terminals 16, 17, via by-pass capacitor C2, and in series for the control current. Capacitor C1 serves the same function as capacitors C in FIGURE 1. Battery B sends a control current through the two diodes in series and resistor R1, which again is of high value in relation to the resistance presented between the signal terminals 16 and 17 of the circuit. This circuit provides a lower range of values of resistance, typically from 10K ohms, for a control current of 50$\mu$ amps, to about 180K ohms for no control current using Hoffman RT–6 diodes.

These latter numerical examples, as in relation to the other figures of the drawings, are furnished merely to provide some indication of the relative orders of magnitude involved, and are not intended to indicate any limits to the performance or scope of the present invention.

If high frequency currents are to be passed through the circuit, it is desirable to choose Zener diodes having as small stray capacitance as possible. Care should be taken to avoid exceeding 80% of the avalanche voltage since the characteristics of the bipolar voltage limiters will change by an accelerated increase of leakage current with time with repeated excursions into the avalanche region after two thousand hours of life. Noise may also be generated by these diodes above about 80% of the avalanche voltage.

There are many useful applications of the variable resistor of the present invention. Those skilled in the art will immediately recognize the application of the present invention to form an electrically controlled attenuator for use in A.C. circuits. The present invention may readily be connected in a circuit to form a current dependent variable resistance attenuator. Another use for the invention is to vary the feedback ratio of an oscillator to vary the amplitude of the output. If the current controlled resistor of the invention is connected as one arm of a voltage divider in the feedback loop of an oscillator, then the amplitude of the oscillator output will vary as the resistance of the variable resistor is varied. If an alternating current is applied to the variable resistor as a control current, then the oscillator output can be modulated. This technique of modulating an oscillator is very useful in many circuits using resistors and capacitors for frequency determination, as well as in circuits using resonant circuits.

Another use for the invention is in a self-protecting solid state chopper. Solid state choppers require very closely matched diodes, and the bipolar voltage limiters or diodes used in the present invention have, so far, given a high yield of matched pairs in each batch of units. Additionally, the resistors of the present invention are not damaged by voltage overloads, since they are basically Zener diodes and will operate in the avalanche mode if excessive voltages are applied. As previously mentioned, repeated excursions into the avalanche region accelerate increase of leakage current and thus may shorten the useful life of the device for some applications.

The present invention may also be used to provide automatic gain control (A.G.C.) for amplifiers. The variable resistor may be connected as an attenuator between stages and control current obtained from the amplifer output in a conventional fashion. This A.G.C. interstage control can be applied to cascode amplifiers, which up to now have not been adaptable to A.G.C. at signal levels above, approximately, 50 millivolts, peak.

It will also be evident that the variable resistor of the present invention can be used as an amplitude modulator if a carrier signal is applied to the signal terminals and one, or more, modulating control currents are applied to the control terminals.

I claim:

1. An electrically controlled variable resistance network comprising:

(a) first and second zener diode means, each means having a pair of zener diodes connected in reverse with respect to one another;

(b) each zener diode means having a nominal reverse current of at least five microamperes at one volt at 25° C.;

(c) first and second signal terminals;

(d) said first and second zener diode means being connected in series with each other between said first and second signal terminals to provide a linearly variable resistance between said first and second signal terminals over a given range of signal voltage drop between said first and second signal terminals; and (e) a source of bias current connected to said first and second zener diode means to vary said resistance.

2. The network defined in claim 1 wherein each said zener diode means comprises a common cathode zener diode pair.

3. The network defined in claim 1 wherein said source of bias current is a direct current source.

4. The network defined in claim 1 wherein said source of bias current comprises a bias current supply having one terminal thereof connected to electrical ground, first variable resistance means connected between another terminal of said bias current supply and the junction between said first and second zener diode means, second variable resistance means connected between electrical ground and said first signal terminals and third resistance means connected between electrical ground and said second signal terminal.

5. The network defined in claim 1 wherein said signal terminals are connected across one of said zener diode pairs, and said source of bias current comprises a bias current supply and variable resistance means connected in series with one another and across said first and second signal terminals.

References Cited by the Examiner

UNITED STATES PATENTS

| | | | |
|---|---|---|---|
| 2,393,785 | 1/1946 | Leeds | 332—56 |
| 2,470,023 | 5/1949 | Ferguson et al. | 332—56 |
| 2,789,254 | 4/1957 | Bodle et al. | 323—66 |
| 2,831,130 | 4/1958 | Obloy | 307—132 |
| 2,852,702 | 9/1958 | Pinckaers | 307—132 |
| 2,876,436 | 3/1959 | Anderson. | |
| 2,945,950 | 7/1960 | Midkiff. | |
| 2,992,395 | 7/1961 | Rich | 330—110 |
| 2,997,664 | 8/1961 | Jensen | 331—109 |
| 3,012,192 | 12/1961 | Lion | 323—75 |
| 3,032,704 | 5/1962 | Beck | 323—66 |
| 3,094,675 | 6/1963 | Ule | 330—110 |
| 3,113,275 | 12/1963 | Minter | 331—109 |
| 3,115,601 | 12/1963 | Harris | 323—66 |

JOHN F. COUCH, *Primary Examiner.*

NATHAN KAUFMAN, LLOYD McCOLLUM, *Examiners.*

F. D. PARIS, A. D. PELLINEN, *Assistant Examiners.*